United States Patent
Wheals

(10) Patent No.: US 9,803,692 B2
(45) Date of Patent: Oct. 31, 2017

(54) BEARING FOR WIND TURBINE

(71) Applicant: RICARDO UK LTD., West Sussex (GB)

(72) Inventor: Jonathan Charles Wheals, Warwickshire (GB)

(73) Assignee: Ricardo UK Ltd., West Sussex (GB)

( * ) Notice: Subject to any disclaimer, the term of this patent is extended or adjusted under 35 U.S.C. 154(b) by 40 days.

(21) Appl. No.: 14/669,856

(22) Filed: Mar. 26, 2015

(65) Prior Publication Data

US 2015/0275975 A1 Oct. 1, 2015

Related U.S. Application Data

(63) Continuation of application No. 13/120,587, filed as application No. PCT/GB2009/002309 on Sep. 24, 2009, now Pat. No. 9,062,660.

(30) Foreign Application Priority Data

Sep. 25, 2008 (GB) .................................. 0817617.4

(51) Int. Cl.
| | | |
|---|---|---|
| F16C 33/58 | (2006.01) |
| F16C 33/66 | (2006.01) |
| F16C 19/38 | (2006.01) |
| F16C 19/52 | (2006.01) |
| F16C 19/55 | (2006.01) |
| F16C 41/04 | (2006.01) |
| F16C 21/00 | (2006.01) |
| F03D 80/70 | (2016.01) |

(52) U.S. Cl.
CPC .......... *F16C 33/6681* (2013.01); *F03D 80/70* (2016.05); *F16C 19/38* (2013.01); *F16C 19/52* (2013.01); *F16C 19/55* (2013.01); *F16C 21/00* (2013.01); *F16C 41/04* (2013.01); *F05B 2240/50* (2013.01); *F05B 2250/314* (2013.01); *F16C 2300/14* (2013.01); *F16C 2360/31* (2013.01); *Y02E 10/722* (2013.01)

(58) Field of Classification Search
CPC ....................................................... F16C 19/55
See application file for complete search history.

(56) References Cited

U.S. PATENT DOCUMENTS

| | | |
|---|---|---|
| 1,574,470 A | 2/1926 | Coffee |
| 2,518,159 A | 8/1950 | Martin |
| 2,769,674 A | 11/1956 | Neuffer |
| 2,789,021 A | 4/1957 | Pedersen |

(Continued)

FOREIGN PATENT DOCUMENTS

| | | |
|---|---|---|
| DE | 39 26 493 A | 2/1991 |
| DE | 100 21 233 A1 | 10/2001 |

(Continued)

OTHER PUBLICATIONS

International Search Report and Written Opinion for Application No. PCT/GB2009/002309 dated Aug. 4, 2010.

*Primary Examiner* — Thomas R. Hannon
(74) *Attorney, Agent, or Firm* — Alston & Bird LLP

(57) ABSTRACT

A bearing has a circular element normally fixed with respect to ground. The circular element associated with the ground element is permitted to idle in rotation, so as to distribute wear around the circumference thereof. Various means of controlling and causing idle rotation are disclosed. Rolling elements are preferably provided between inner and outer races of a bearing assembly.

11 Claims, 12 Drawing Sheets

(56) References Cited

U.S. PATENT DOCUMENTS

| | | | |
|---|---|---|---|
| 2,979,367 A | 4/1961 | Mims et al. |
| 3,025,114 A | 3/1962 | Beecher |
| 3,026,154 A | 3/1962 | Marchand |
| 3,547,503 A | 12/1970 | Konet |
| 3,597,029 A | 8/1971 | Marcum |
| 3,642,331 A | 2/1972 | Silver |
| 3,671,093 A | 6/1972 | Wieck |
| 3,796,472 A | 3/1974 | Fernlund |
| 3,854,781 A | 12/1974 | Bildtsen |
| 4,133,587 A | 1/1979 | Kume |
| 4,542,994 A | 9/1985 | Mohsin |
| 4,605,317 A | 8/1986 | Bonaccorso |
| 4,618,271 A | 10/1986 | Li |
| 5,074,680 A | 12/1991 | Hoch et al. |
| 6,196,725 B1 | 3/2001 | Brown |
| 7,353,926 B2 | 4/2008 | Ikeda et al. |
| 8,356,586 B2 | 1/2013 | Roderique |
| 2010/0008612 A1 | 1/2010 | Grehn |

FOREIGN PATENT DOCUMENTS

| | | |
|---|---|---|
| DE | 10 2006 040777 A1 | 3/2008 |
| RU | 2 073 801 C1 | 2/1997 |

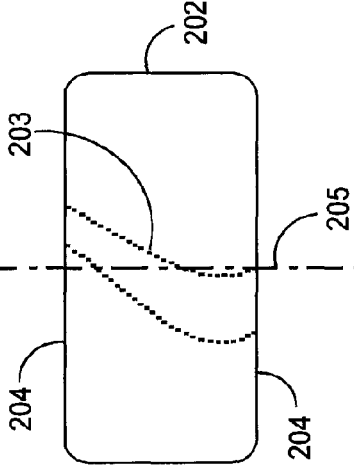
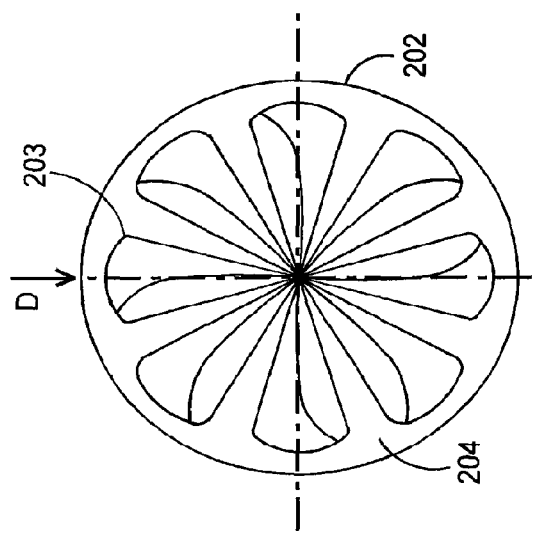
FIGURE 10a
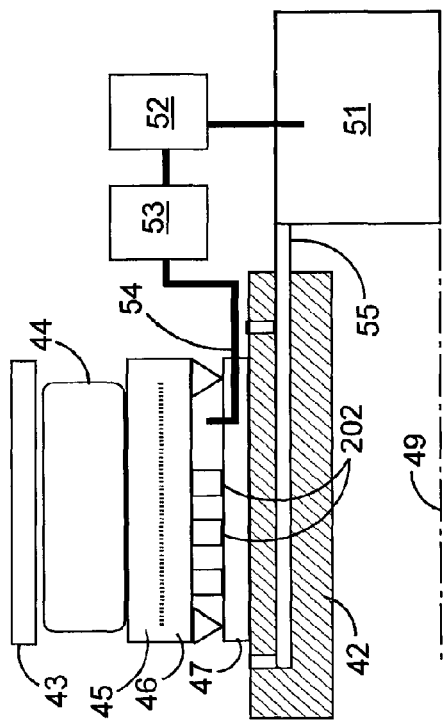
FIGURE 9
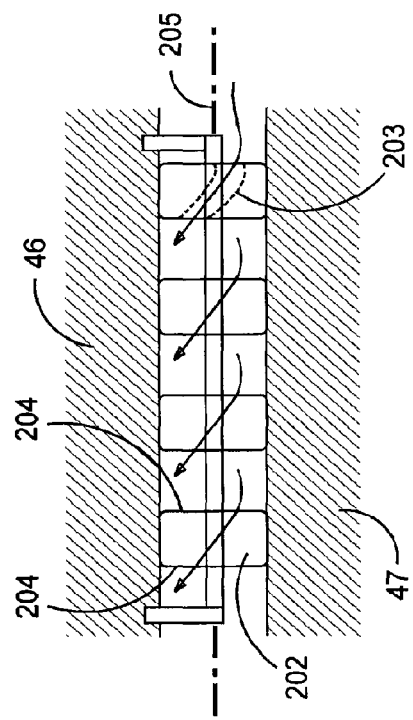
FIGURE 10b
FIGURE 10c

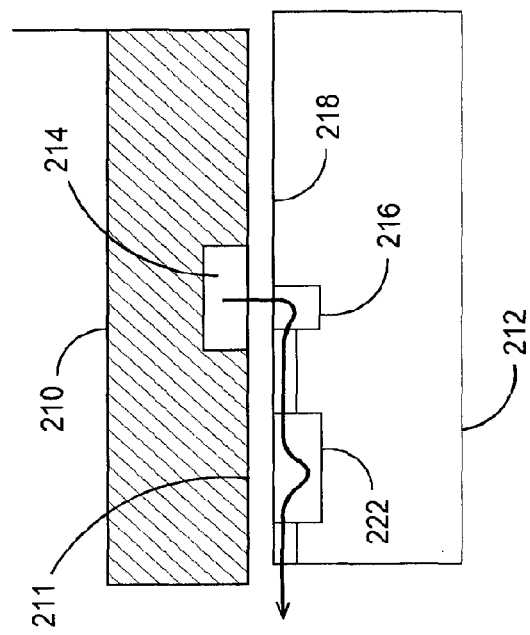
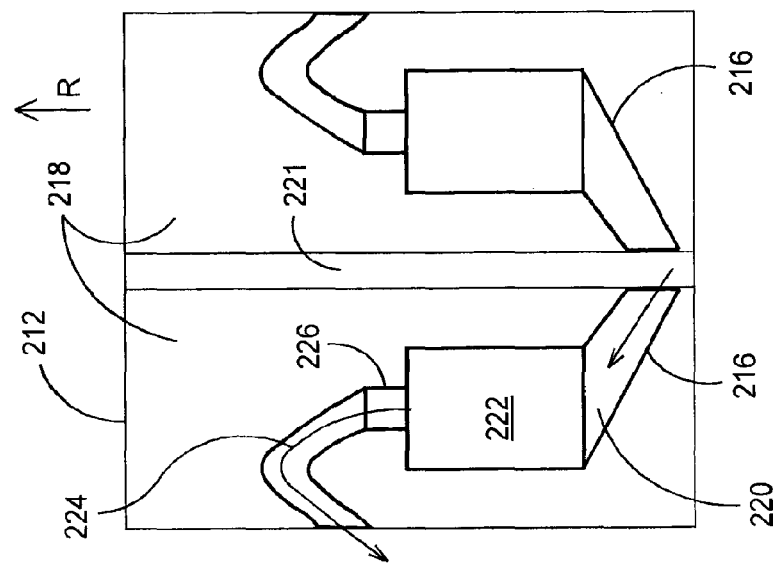
FIGURE 11b
FIGURE 11a

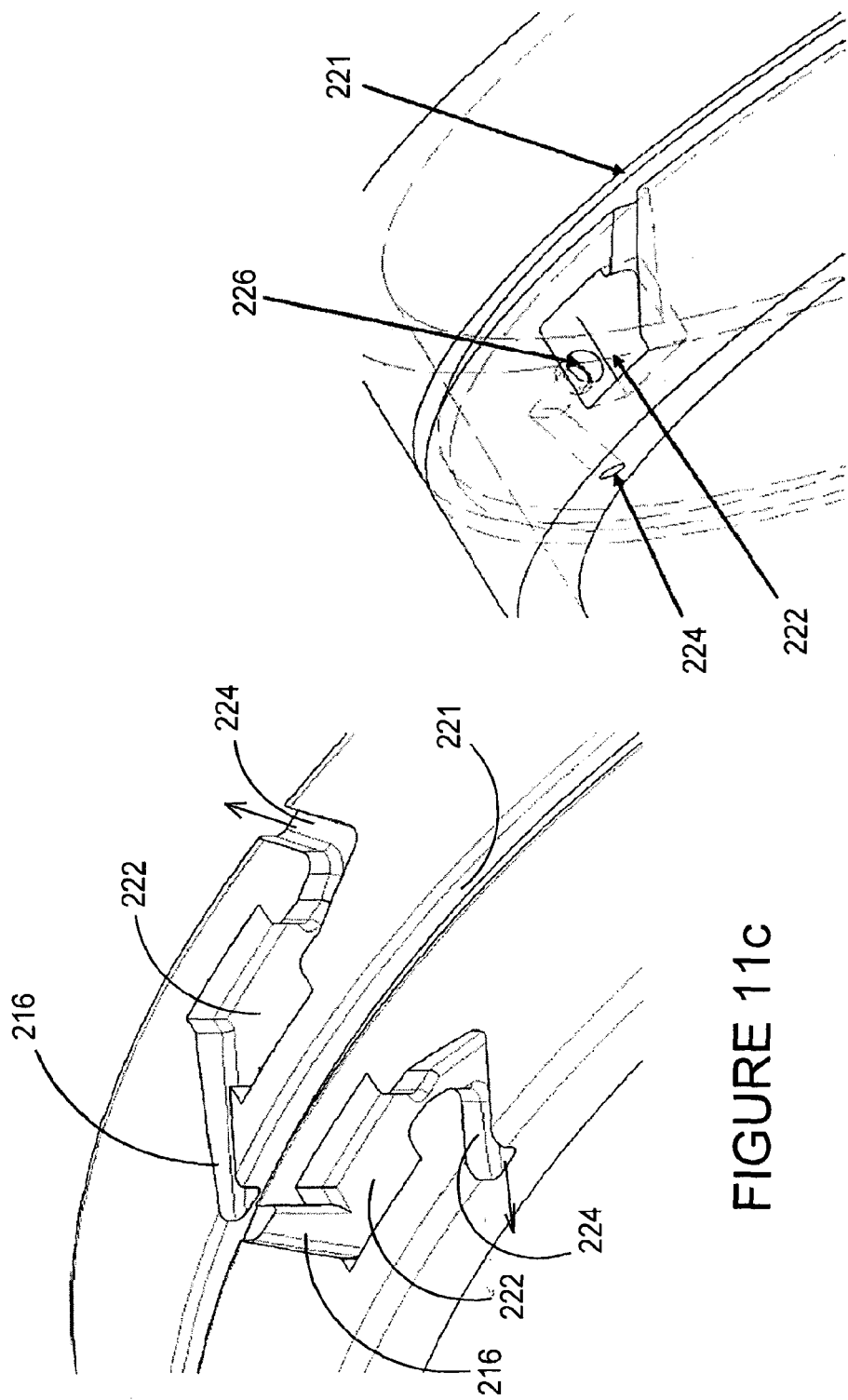

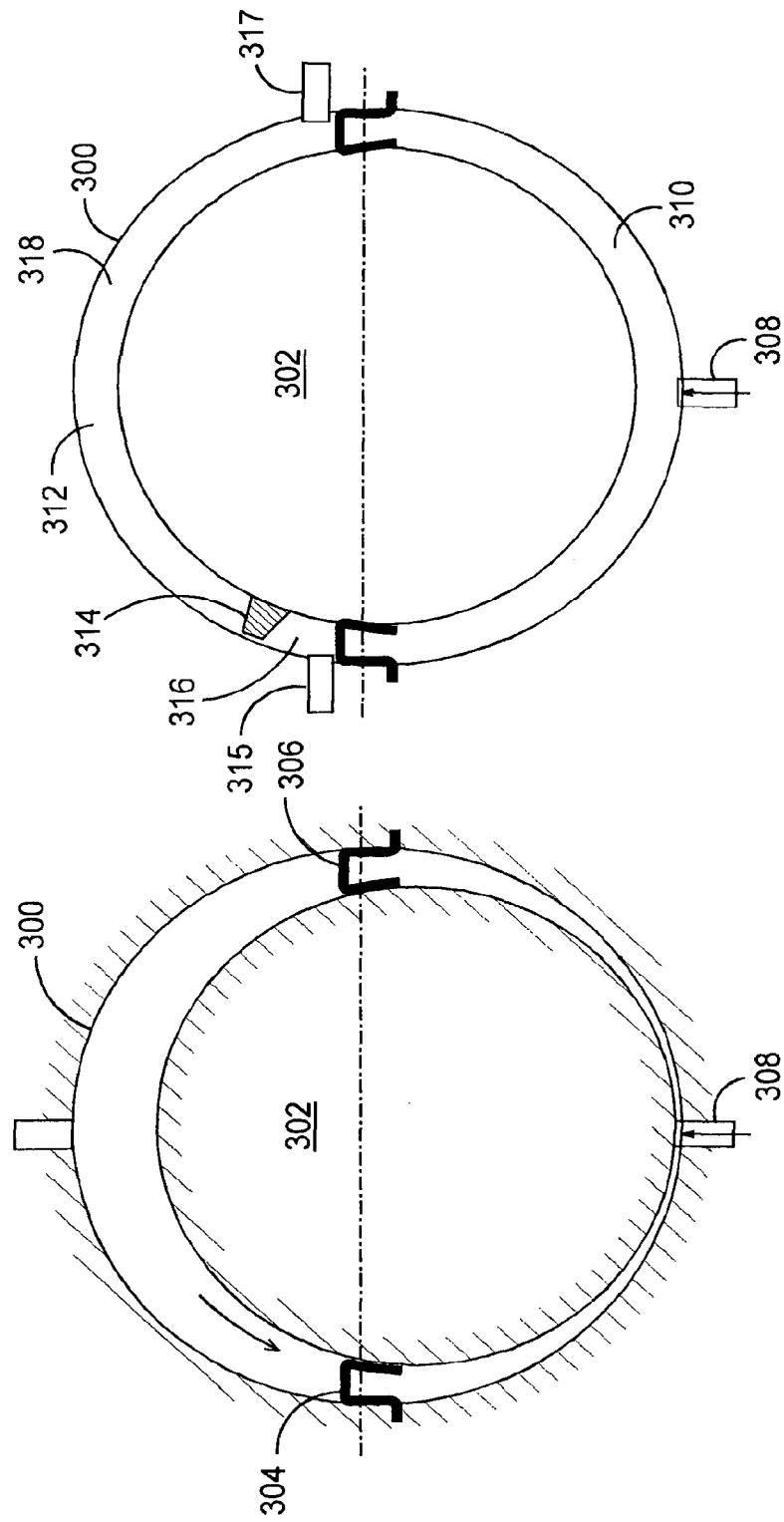

BEARING FOR WIND TURBINE

CROSS-REFERENCE TO RELATED APPLICATIONS

This application is a continuation of U.S. patent application Ser. No. 13/120,587, filed Jun. 3, 2011, which is a U.S. National Phase under 35 U.S.C. §371 of International Application PCT/GB2009/002309, filed Sep. 24, 2009, which claims priority to GB 0817617.4, filed Sep. 25, 2008, each of which is incorporated herein in its entirety.

FIELD OF THE INVENTION

This invention relates to a bearing comprising a fixed element and a concentric moving element, and preferably comprises concentric inner and outer races having a plurality of rolling elements therebetween. The rolling elements may comprise balls or rollers, and be arranged in one or more rows.

BACKGROUND

Typically such a bearing supports the rotating load with respect to ground. The fixed element is typically a plain bearing or a race, and the moving element has a bearing journal or a race fixed to the moving element, typically by an interference press fit. The weight of the load is taken vertically on the upward facing side of the fixed element, via the rolling elements where provided. The moving element rotates in use, so that the load is transmitted progressively and repeatedly around the entire circumference thereof. However the fixed element which is stationary with respect to ground, has weight taken continuously by the same upwards facing portion; conversely the downwards facing portion takes no weight. As a result wear of the relatively fixed element is asymmetric, and the bearing may require replacement more frequently than if wear had been distributed around the entire circumference of the fixed element.

The problem of asymmetric wear is most apparent in bearings which support sustained unidirectional loads and/or support high bending forces in the vertical plane, such as hub bearings of wind turbines. The traditional solution is to employ larger bearings of high precision, but also to accept that more frequent replacement may be necessary. Large bearings are difficult and expensive to manufacture, and tend also to suffer disproportionate deterioration due to vibration compared with small bearings.

What is required is an arrangement capable of eliminating this kind of asymmetric wear profile, but which is adaptable to standard types of bearing, particularly rolling element bearings, and particularly to the fixed and moving elements which transmit loads via the bearing.

A further problem is sustained static pressurisation of bearing lubricant between the metal surfaces of the bearing. This occurs in the region of the upper side of the fixed race of the bearing arrangement when it is static. Over time, hydrogen atoms may escape from hydrocarbon molecules in the lubricant and react with the metal surfaces resulting in hydrogen embrittlement of the metal surfaces, which increases the incidence of failure.

What is required is an arrangement capable of limiting the exposure of the metal surfaces to prolonged contact with static pressurised lubricant.

BRIEF SUMMARY OF EXAMPLE EMBODIMENTS

According to a first aspect of the invention there is provided a bearing comprising a circular member normally fixed with respect to a ground element, and adapted to support a rotating load, wherein said member is adapted to idle in rotation on the ground element in a controlled manner.

Although the invention is applicable to a plain bearing, the invention is particularly suitable for a rolling element bearing having rolling elements between inner and outer races.

In the case of a plain bearing or bush, the normally rotating member is a shaft within the normally stationary bearing or an annulus rotatable on the normally stationary bearing. The normally rotating member may itself bear upon the normally stationary bearing, or may have a separable race or bush fixed for rotation therewith.

The bearing of the invention is thus arranged so that a normally fixed element is adapted to idle on its support. The idling speed is preferably imperceptible, and may be as low as a few revolutions over the rotational life of the bearing. Idling may be in the range 0.1 degree per day to 0.1 revolutions per minute.

Faster idling may be permissible according to the type and size of bearing, and kind of installation. In any event idling above 50 rpm, alternatively one tenth of hub speed, is not envisaged. Furthermore the invention is particularly suitable for large bearings, having a shaft diameter in excess of 250 mm.

In order to idle, the normally fixed element slides on or in the ground element, rather than being an interference fit, and the corresponding diameter of this race may be dimensioned accordingly. Thus where the inner race is mounted on the ground element, the inner diameter is slightly increased; where the outer race is on the ground element, the outer diameter is slightly reduced. Alternatively the ground element may be sized as a relatively loose fit in or on the adjacent race.

In accordance with the invention, the grounded bearing element should not rotate at a speed sufficient to cause wear of the ground element or of the bearing itself, and is preferably at least an order of magnitude less than the speed at which such wear is measurable over the life of the bearing.

The idling rotation may be continuous. Intermittent motion is also within the scope of the invention, and may be suitable where the bearing can tolerate a fixed position of the normally fixed element for a pre-determined period—for example up to 5 years. Reversing and reciprocating motion is also envisaged.

In a preferred embodiment the idling speed is regulated, for example by a brake and/or by gearing.

In one embodiment rotation of the bearing element of the ground element is associated with rotation of the race of the moving element, and in one preferred embodiment idling is a direct result of rotation of the moving element.

Rotation of the normally fixed bearing element on the ground element may be enabled upon rotation of the moving element.

In one embodiment, rotation of a ground element race may be by drag from rolling elements, idling being assured by precise control of clearances or by a brake mechanism for the race of the ground element. In the alternative, periodic rotation may be as a result of thermal expansion reducing such clearances in use, thus ensuring idling rotation by drag forces. Thermal expansion may result from forces being transmitted through the bearing or by an externally controlled heating element. Wind turbines typically generate electricity, so that an electrically powered heating element is one possibility.

The rotation of a race may be provided by turbine elements in engagement with the race which are arranged to rotate when a pressure differential is applied across them. Preferably the turbine elements are powered by the hydraulic fluid, more preferably the turbine elements are located within an annular cavity between a race and the ground element forming a hydrostatic bearing. The turbine elements may be combined roller/micro turbines.

According to a second aspect of the invention there is provided a bearing assembly comprising an outer race and a generally concentric inner race defining an annular cavity therebetween, a turbine being provided in said cavity, the turbine being arranged to impart a torque on one of said races when a fluid pressure differential is applied across the annular cavity from side to side.

A plurality of said turbines may be provided in the cavity.

Preferably the or each turbine is a combined roller turbine. Alternatively the turbine may be non load-bearing, alternative means, such as a hydrostatic bearing being provided to support the moving race. In a preferred embodiment plural turbines are in contact with both races. In one embodiment each turbine is generally cylindrical and comprises a main axis parallel with a main axis of the races, and having a generally axial open bore having a circumferential component such that a fluid passing therethrough imparts a torque on the turbine. Preferably the cavity is filled with hydraulic fluid forming a hydrostatic bearing for the races.

In another embodiment each turbine has a conical drive face and can be urged axially of the bearing assembly into engagement with a mating driven face for traction drive in response to fluid forces acting via the turbine. A light spring urges the drive and driven faces out of engagement when fluid pressure in insufficient.

In one embodiment idling motion is provided by an external power source, such as an electric, magnetic or hydraulic motor. In another embodiment idling motion is provided by the moving element, for example via gearing from the race of the moving element or hub, or from a cage of rolling elements.

A hydrostatic bearing may be provided between a race of the ground element and the ground element itself, a hydraulic lift force being generated by a pump powered externally or by a moving element. In one embodiment, the race of the ground element includes physical features, such as shaped channels, adapted to generate a rotational force in response to hydraulic pressure, and thereby ensure idling rotation. The race of the ground element may be an impulse turbine, e.g. a Pelton wheel. The hydraulic medium is preferably the lubricant of the bearing.

A gear arrangement may be provided to idle a race of the ground element. In one embodiment an elliptical flex spline gear (aka harmonic wave drive) in engagement with a circular annulus provides substantially continuous rotation of the race of the ground element, at a high reduction ratio, and with very low tooth friction.

The bearing of the present invention is particularly suitable for wind turbines and the like, in which the mass of the rotor and hub is very large, the flexure forces are high due to wind buffeting during storm parking, the difficulty of bearing replacement is high, and the consequences of bearing failure catastrophic.

In particular the moving element (i.e. rotor and hub) may weigh 50 tonnes or more, and is cantilevered at one side of the ground element (i.e. the mast). As a result vertical loads through the race of the fixed bearing element are very high, and overall bearing diameter is larger. The cost of large diameter bearings typically increases disproportionately to the increase in diameter.

When parked in a storm, for example at very high wind speeds, flexure of the rotor and mast result in concentrated wear at the top and bottom of a race of the ground element, typically as the usual lubrication layer is breached.

Bearing replacement is difficult and expensive, not only because the rotor/hub assembly is very heavy but also because many wind turbines are at sea and accessible only during calm weather or in certain seasons. Very expensive barge mounted cranes are required.

Catastrophic bearing failure may cause the collapse of a wind turbine, with considerable dissipation of energy and the potential for loss of life.

Typically if a conventional bearing has a service life of five years, and exhibits asymmetric wear due to vertical loads over about 20° of the circumference of a race of the ground element, idling of this race will increase life by a factor of 18 (90 years), by utilizing the entire circumference thereof.

Taking into account that some wear may take place at the bearing underside, due to cantilever loads and wind buffeting, idling rotation of the relatively fixed race will increase life by a factor of 9 (45 years).

Such increases in potential life are very significant, and may alternatively result in the possibility of using rolling element bearings of reduced external diameter whilst still giving a service life well in excess of a planned maintenance period of e.g. 10 years.

Actively controlled rotation of the idling bearing relative to the ground element is preferably undertaken by a control system. Such a control system monitors various inputs to determine the position and/or speed of rotation of the idling bearing within the ground element.

According to a third aspect of the invention there is provided a control system for the aforementioned idling bearing, said control system comprising an input and a processor, in which the control system is arranged to adjust the motion of the idling bearing by receiving an input signal via the input concerning the operating condition of the bearing, processing the input with the processor to determine the desired motion of the bearing and arcuately moving the bearing in accordance with the desired motion.

The control system may determine the position and/or speed of rotation of the idling bearing by for example by interpreting one or more of the following:

Stored information regarding anticipated wind speeds,
Real time information regarding current and anticipated wind speeds,
Information on the wholesale price of electricity,
Sensed/inferred torques and/or speeds of either race or the rotor,
Sensed/inferred accelerations and vibrations,
Sensed loads within the turbine blades,
Lubricant temperature,
Position of idling race,
Vibrational data,
Data from adjacent/upwind turbines regarding real time weather conditions.

The control system may include a look-up table to permit a value of an appropriate idling speed/bearing position to be determined.

The control system may avoid loading at certain positions of the idling bearing, based on measured or inferred parameters (e.g. vibrational data) which suggest damage to that part of the race. The speed of rotation of the idling bearing may be adjustable and/or reversible.

The control system may determine the speed and/or position of the idling bearing dependent on one or more parameters fed into an algorithm.

The control system may determine an appropriate bearing service interval based on the above parameters and alert a remote supervisory control system.

The control system may allow output of a wind turbine to be optimized having regard to the next scheduled service interval.

BRIEF DESCRIPTION OF THE DRAWINGS

Other features of the invention will be apparent from the following description of preferred embodiments shown by way of example only in the accompanying drawings in which:—

FIG. 9 illustrates schematically a roller turbine bearing assembly in accordance with the invention.

FIG. 10a illustrates parts of the roller turbine bearing of FIG. 9.

FIG. 10b illustrates parts of the roller turbine bearing of FIG. 9.

FIG. 10c illustrates parts of the roller turbine bearing of FIG. 9.

FIG. 11a illustrates schematically a hydrostatic bearing in accordance with the invention, and having impulse exhausts.

FIG. 11b illustrates schematically a hydrostatic bearing in accordance with the invention, and having impulse exhausts.

FIG. 11c illustrates schematically a hydrostatic bearing in accordance with the invention, and having impulse exhausts.

FIG. 11d illustrates schematically a hydrostatic bearing in accordance with the invention, and having impulse exhausts.

FIG. 12a illustrates schematically a hydrostatic bearing in accordance with the invention, and having a vane to permit arcuate movement thereof.

FIG. 12b illustrates schematically a hydrostatic bearing in accordance with the invention, and having a vane to permit arcuate movement thereof.

DETAILED DESCRIPTION

Figure 1:
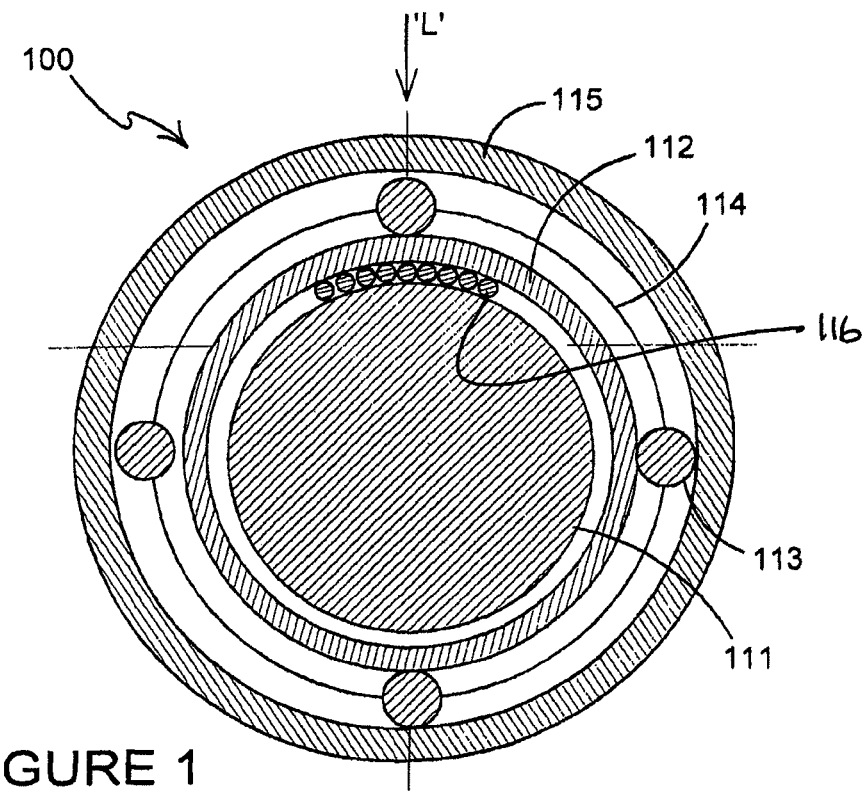
FIG. 1 is a schematic vertical section of a rolling element bearing according to the present invention in a plane, orthogonal to the rotational axis.

With reference to FIG. 1, a rolling element bearing 100 for a wind turbine is mounted upon a ground element, typically a horizontal cylindrical stub 111 of a mast. The bearing comprises an inner race 112 on the stub 111, a plurality of rolling elements 113, a cage 114 to hold the rolling elements 113 in a predetermined angular relationship, and an outer race 115 for attachment to the moving element, namely the rotor and hub.

The present invention is illustrated schematically by small rolling elements 116 between inner race 112 and stub 111, which permit relative rotation whilst supporting the vertical load 'U. Such elements 116 would in practice extend around the entire circumference.

Figure 2:
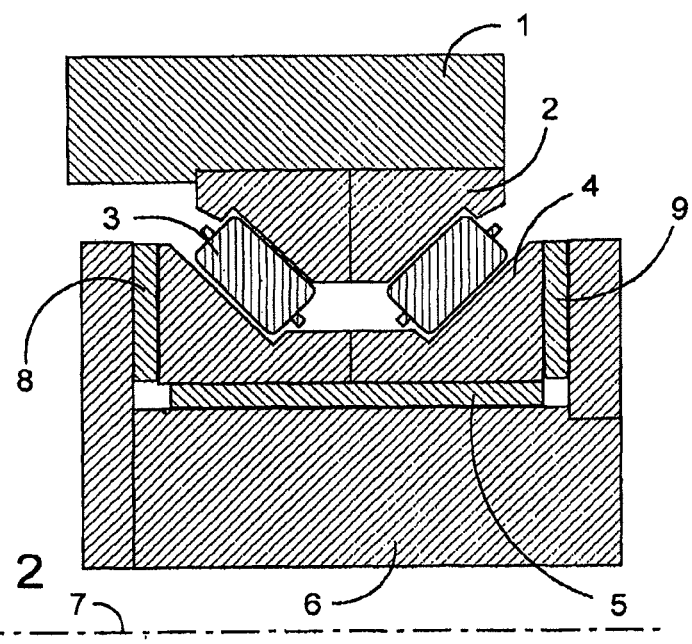
FIG. 2 is a schematic vertical section of a rolling element bearing according to the present invention, along the rotational axis.

FIG. 2 illustrates a practical bearing arrangement of a wind turbine having a rotor/hub assembly 1 rotatable about an axis 7 on a ground element 6 via an outer race 2, opposed double row rolling elements 3, and inner race 4. A typical conventional bearing for a wind turbine is shown in DE-A-3926493.

Reference numeral 5 indicates a plain bearing upon which the inner race may idle in accordance with the invention; similar plain bearings 8,9 may be provided to react axial loads.

Various means of enabling idling rotation of the race of the ground element are possible. In the following description it will be assumed that the race of the ground element is the inner race; however it will be appreciated that the outer race may alternatively be the grounded race, and such alternatives are within the scope of the present invention.

The natural drag of the rolling elements will exert a rotational force on the inner race which is normally resisted by the gripping force of the interference fit between inner race and ground element. By increasing the circumferential clearance between inner race and ground element, rotation of the inner race can be assured. However in the present invention, uncontrolled rotation is not desired, and accordingly a brake is required between the inner race and ground element. Many kinds of brake are suitable, for example friction, hydrodynamic, magnetic or electrical. The means selected should assure idle rotation in all operating conditions, and may link speed of idle rotation to speed of the rotor/hub assembly and/or power generated thereby. In this way idle rotation may be faster at times when vertical bearing loadings are high, so as to ensure that flat spots and the like are avoided.

Figure 3A:
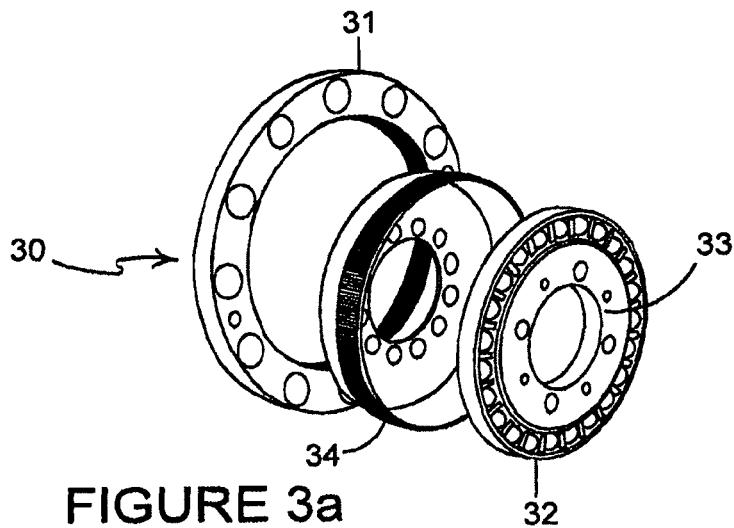
FIG. 3a illustrates the components of a flex drive gear coupling in exploded form.
Figure 4:
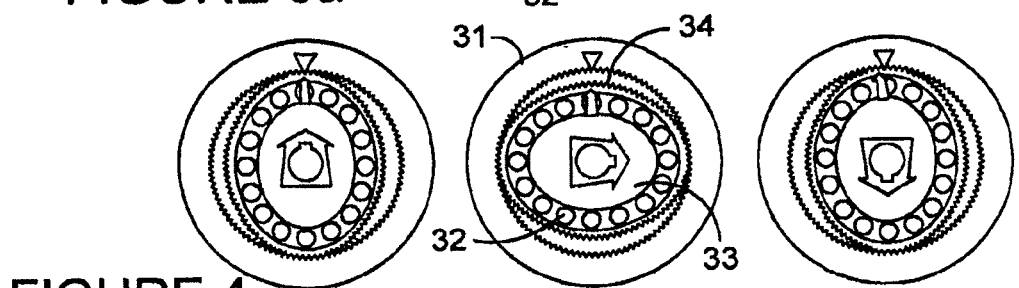
FIG. 4 illustrates operation of a flex drive coupling in successive stages.
Figure 5:
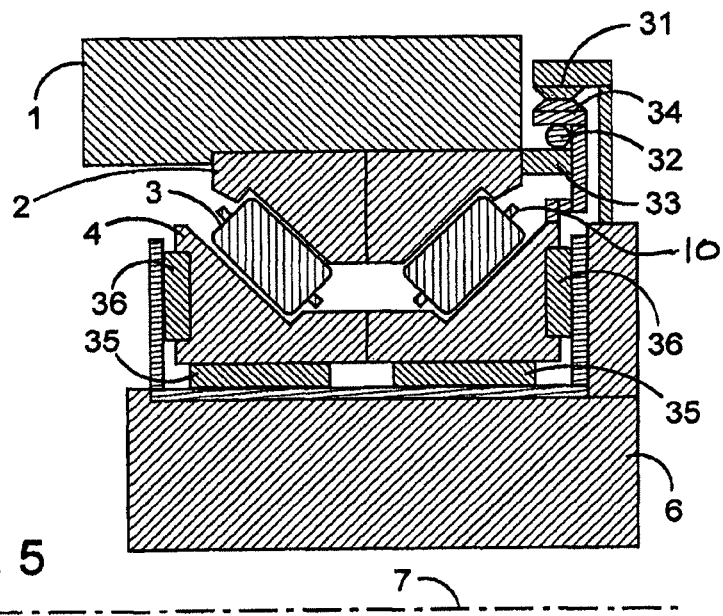
FIG. 5 is a schematic adaptation of the flex drive coupling of FIGS. 3 and 4 to the bearing arrangement of FIG. 2.
Figure 3C:
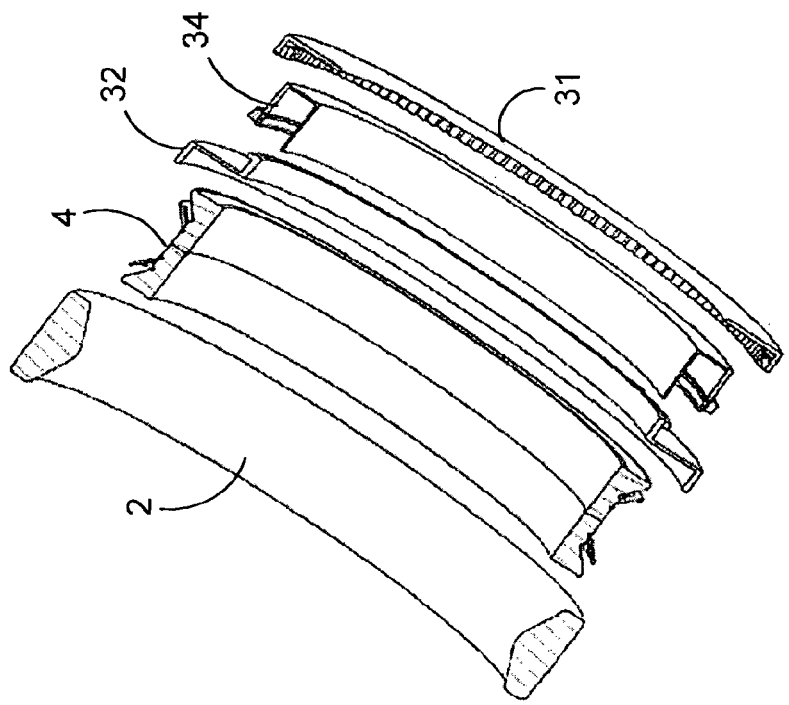
FIG. 3c illustrates the components of a flex drive gear coupling in exploded form.
Figure 3B:
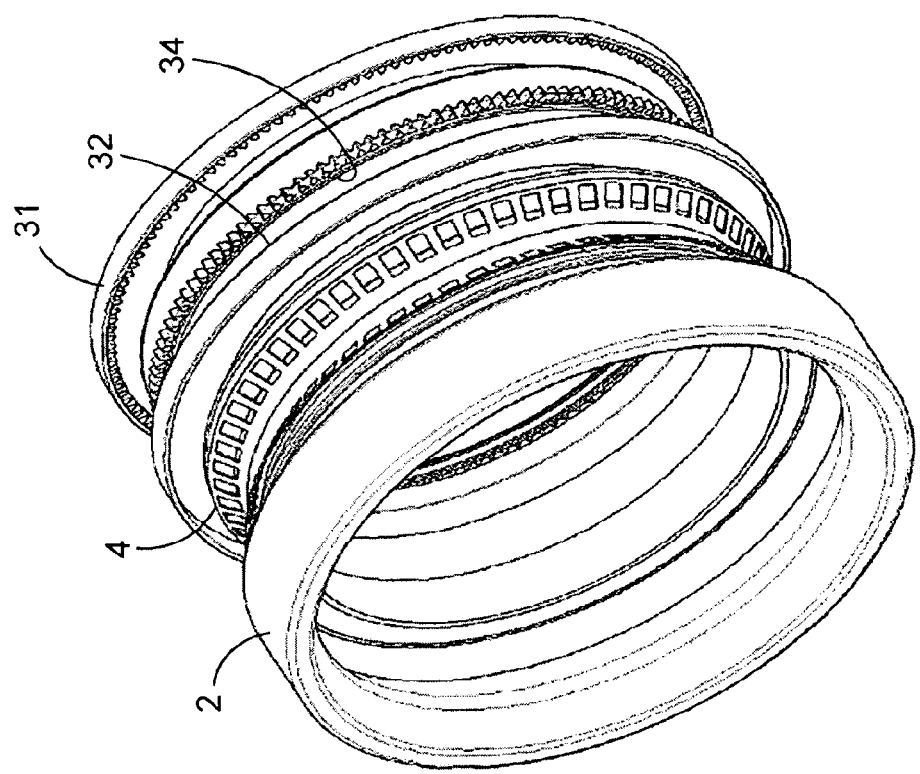
FIG. 3b illustrates the components of a flex drive gear coupling in exploded form.

Preferably, in order to more accurately determine bearing life, the inner race is directly driven, for example via a gear transmission. FIGS. 3-5 illustrate one preferred arrangement using a flex-spline drive.

The flex drive spline assembly 30 comprises a circular annulus 31 with internal gear teeth, an elliptical sun comprising a thin race rolling element bearing 32 pressed on to an elliptical plug 33, and a flexible bowl-like link member 34 having external teeth for engagement with the annulus 31.

As illustrated in FIG. 4, the link member is a sliding fit on the elliptical outer race of the bearing 32, and distorts circumferentially as the outer race rotates. The link member 34 is typically of an industrial grade polymer whereas the bearing 32 and annulus 31 are of steel.

The plug 33 is dimensioned to ensure during engagement of the teeth of the link member and annulus on the major elliptical axis, and disengagement on the minor axis.

In effect, the plug 33 is a wave motion generator which provides for continuous rotation of the annulus at very high gear ratio reduction, typically up to 1000:1.

FIG. 5 shows an illustrative arrangement applied to the bearing arrangement of FIG. 2, and providing self generation of inner race idle rotation.

The annulus 31 is attached to the ground element 6; the plug 33 is attached to the outer race 2, and the flexible link member 34 is connected to the inner race 4. The rolling element bearing 32 lies between the plug 33 and link member 34, as illustrated. Further needle rollers 36 may be provided to resist thrust loads on the bearing.

Although needle rollers 35,36 are illustrated, ball bearings, plain bearings or a lubricant film may be sufficient depending on the duty required.

In an alternative, the annulus can be the geared output if the link member is grounded. Furthermore, the cage 10 of the rolling elements 3 could provide the input for the elliptical plug 33, provided that skidding of the rollers can be obviated.

Figure 6:
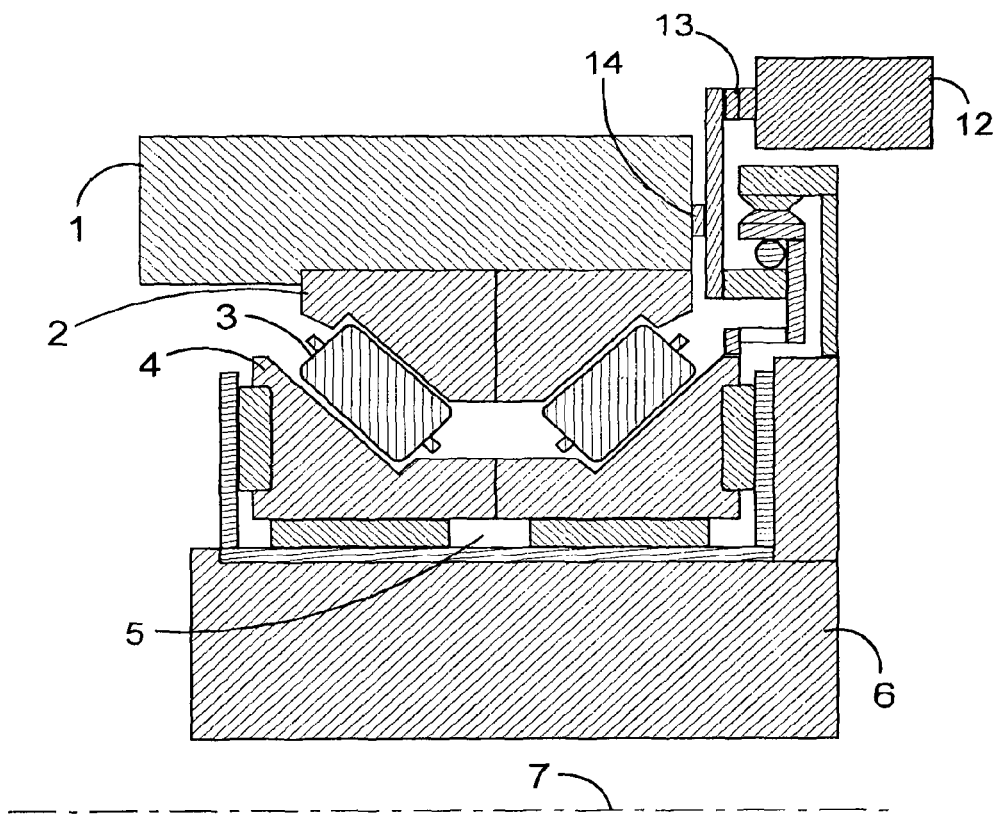
FIG. 6 is a schematic adaptation of the arrangement of FIG. 5 to provide for a motor driven storm parking.

FIG. 6 illustrates an alternative embodiment having an external drive for storm parking of a wind turbine rotor. Storm parking typically requires the rotor to be retained in a position in which a rotor blade is not in front of the mast—this avoids potential contact damage due to flexing of the blades in high winds. Typically a three blade rotor will be storm parked with one blade vertically up from the rotor axis.

The numeral references in FIG. 6 correspond to FIG. 5, but additionally an electric motor 12 is provided to rotate the hub assembly 1 directly, and thus permit the rotor to be positioned for storm parking. Since most wind turbines generate electricity, and in any event have an electrical supply for control purposes, an electric motor is a suitable means of motive power; other kinds of motor are however possible. The motor may be conventionally clutched to prevent driven rotation during normal turbine use.

In an alternative one or more rotary one-way clutches may provide for rotation of the rotor assembly in the opposite direction to that generated by the flex drive assembly 30. Such clutches are simple and reliable, and automatically disengage upon normal rotor direction. A typical one-way clutch is illustrated in U.S. Pat. No. 7,353,926. As illustrated the motor may drive the inner race via one-way clutch 13; a second one-way clutch 14 providing drive from the plug 33 to the hub 1 for normal uni-directional turbine operation.

Figure 7:
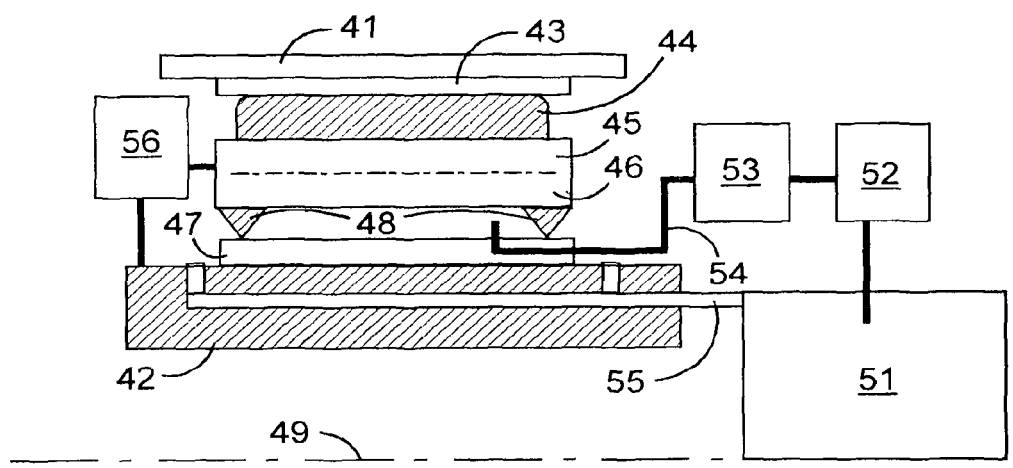
FIG. 7 illustrates schematically a combined hydrostatic bearing and drive system in accordance with the invention.

An alternative embodiment is illustrated schematically in FIG. 7, and comprises a combined hydrostatic bearing and drive system.

A rotor/hub assembly 41 is mounted on a stub 42 of a ground element by a bearing consisting of an outer race 43, rolling elements 44 and an inner race 45. Pressed in the inner race 45 and on the stub 42 are inner and outer cylindrical elements 46,47 of a hydrostatic drive bushing.

A system of supplying fluid (typically oil) under pressure comprises a reservoir 51, a pump 52, a control valve 53, a supply duct 54 to the annular space between the elements 46,47 and a drain passage 55 within the stub 42. Oil seals 48 are shown schematically. The pump is typically electrically driven via the usual power supply of a wind turbine, but other forms of power are possible.

A variable brake 56 (for example friction, hydraulic, magnetic or electrical) is operable to couple the inner race 43 to ground, via the stub 42. The rotational axis is represented by chain-dot line 49.

In use the pump 52 is driven to provide a hydrostatic bearing for the inner race 45. The lift force required may be regulated by the valve 53 according to dynamic and static loads exerted by the rotor/hub assembly 41; the valve 53 may be constituted by a capillary passage or the like. In this condition the inner race 45 is free to turn upon the stub 42, the speed of rotation being regulated, in accordance with the invention to idling speed, by variable brake 56. As an alternative to the variable brake a geared drive, in the manner of FIG. 5 may be coupled between the stub 42, inner race 45 and outer race 43.

The facing surfaces of the elements 46,47 may be channeled so as to provide hydrostatic pockets better able to form and retain a self-stabilizing fluid film.

The form of the shaped channel and/or micro turbines or vanes is selected to give the desired impetus and typically comprises reaction faces generally transverse to the circumferential direction.

The brake may be active, and under feedback control to assure a predetermined idle, or may be passive. A passive brake may for example comprise a multi-plate clutch pack having a shear sensitive grease as lubricant—such grease may for example have a maximum shear rate regardless of input force, and thus regulate speed. Suitable cooling arrangements may be required.

Figure 8:
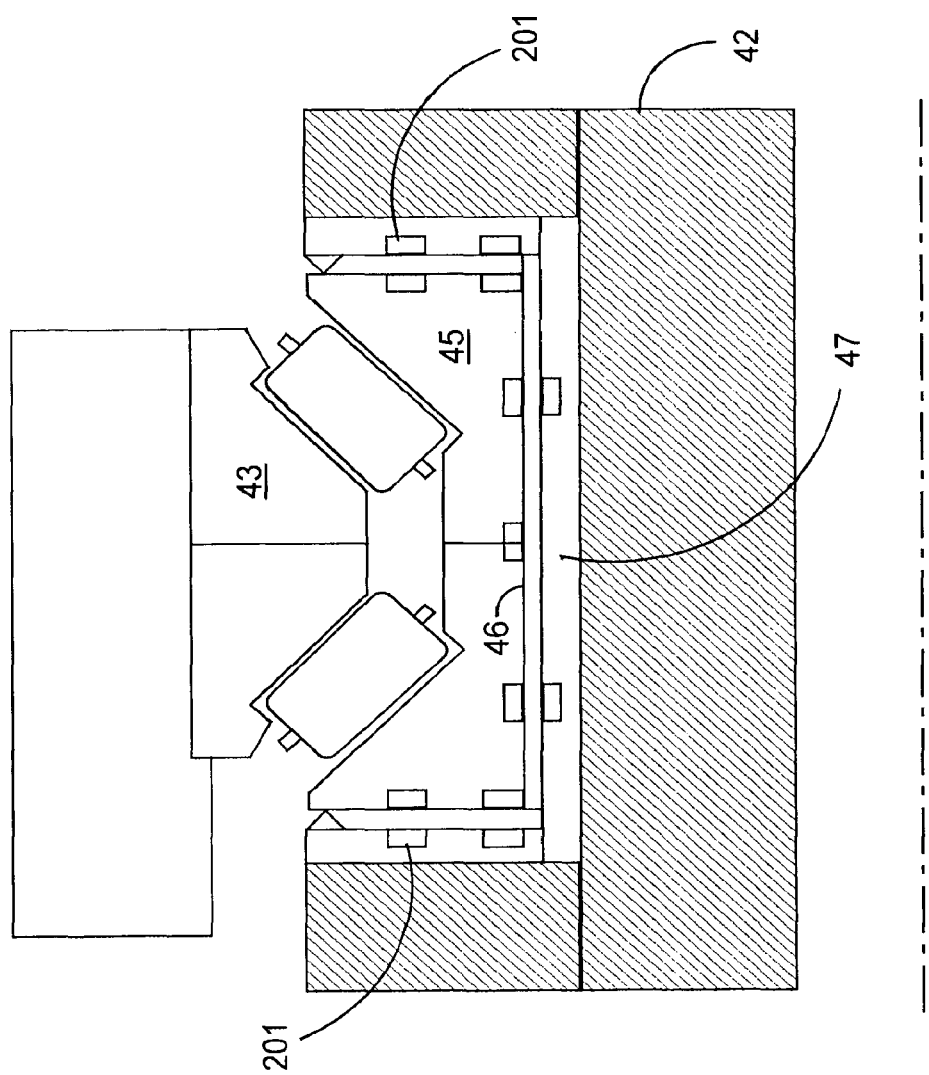
FIG. 8 illustrates schematically a further hydrostatic bearing in accordance with the invention.

In a further alternative to FIG. 7, shown in FIG. 8 the variable brake 56 may be substituted by shaped channels 201 adapted to generate a rotational force between the elements 46,47. Thus fluid pressure supplied via the duct 54 (not shown in FIG. 8) serves the dual purpose of forming the hydrostatic bearing and idling the inner race 45 on the stub 42.

In a still further alternative to FIG. 7, shown in FIG. 9, the annular space between the elements 46 and 47 contains rolling elements 202. The rolling elements 202 are combined micro turbine roller elements, details of which can be seen in FIGS. 10a to 10c.

Each rolling element 202 is generally cylindrical comprising end faces 204 oriented with a main axis 205 parallel to the axis 49. Each rolling element 202 defines a plurality of flow paths 203 shaped to receive the axial hydraulic fluid flow and utilise the flow to rotate the element 202. As each element rotates it imparts a tangential force on the relatively fixed race to rotate it by traction.

Each path 203, as well as transmitting the fluid axially along the elements 202 also has a generally circumferential component which causes the fluid passing therethrough to impart a torque on the element 202.

The rolling elements 202 may also act as a pump to provide a generally circumferential flow around the race. Such a pumping action can be arranged to cause further rotation of the elements 202 as the race rotates, thus causing further pumping as a positive feedback mechanism.

The elements 202 need not be load bearing, and in non-load bearing applications may be made from e.g. plastics material. In such an arrangement load may be supported by load-bearing elements and/or hydrostatic forces.

Referring to FIGS. 11a-11d, a ground element 210 and a race 212 are shown. The ground element comprises a hydraulic fluid inlet 214 to create a hydrostatic bearing between the ground element 210 and the race 212. The race 212 defines a flow path 216 as will be described below.

The flow path 216 is machined into an outer face 218 of the race 212 to form an open flow channel. The path comprises an inlet duct 220 (comprising an annular channel 221), a hydrostatic bearing pad 222 and an outlet duct 224. A pressure release valve 226 is located between the hydrostatic bearing pad 222 and the outlet duct 224.

Hydraulic fluid enters the inlet channel 216 from the fluid inlet 214. The hydraulic fluid then enters the hydrostatic bearing pad 222 where its pressure acts on an inner face 211 of the ground element 210. The pressure acts to support the race 212 within the ground element 210. Once the pressure in the pad 222 has reached a predetermined level, the pressure release valve 226 opens and allows the hydraulic fluid to enter the outlet duct 224.

The ducts 220, 224 may be closed if the hydrostatic pad 222 is of sufficient size.

The outlet duct 224 defines a direction change within the race 212. The direction change shown is about 90 degrees. This change in direction causes a fluid momentum change which urges the race 212 to rotate in direction R about an axis 209.

The valve 226 ensures that the race 212 is supported on a film of fluid before urging it to rotate, to avoid unnecessary wear.

Utilising a pair of symmetric channels 216 (as shown in FIG. 11 a) eliminates any undesirable axial force components acting on the race 212.

Alternatively, the outlet channel 224 may be replaced by jets acting on e.g. stator vanes on the ground element 210 to rotate the race 212.

Referring to FIGS. 12a and 12b a further alternative for race support and motion is shown. A ground element 300 defines a cylindrical cavity which is provided with a race 302 within. The race 302 comprises a bearing assembly as disclosed above (not shown). A pair of diametrically opposed seals 304, 306 are provided at the sides of the race 302 between the race 302 and the ground element 300. A hydraulic fluid inlet 308 is provided at the bottom of the ground element 300.

The race 302 is supported within the ground element 300 by applying hydraulic fluid under pressure at the inlet 308. A hydrostatic bearing surface is thus created to provide a lift force across a lower part-annular area 310 between the element 300 and the race 302. The seals 304, 306 expand to reduce leakage from the area 310.

An upper part-annular area 312 is also defined in which a vane type seal 314 projects from the upper surface of the race 302. The seal may be urged outwardly by a light spring (not shown). A first port 315 and a second port 317 are defined in the element 300 and can selectively deliver hydraulic fluid under pressure.

The seal 314 rubs against the element 300 to define a first piston chamber 316 and a second piston chamber 318. Thus, the race 302 may be rotated clockwise by administering hydraulic fluid to port 315 whilst draining fluid from port 317. The race 302 may be rotated counter clockwise by reversing the ports.

It will be understood that the hydrostatic bearing area need not be 180 degrees (as shown). Rather the area may be reduced to as little as 20° (by moving the seals 304, 306) in order to increase the range of motion of the race 302.

Figure 13A:
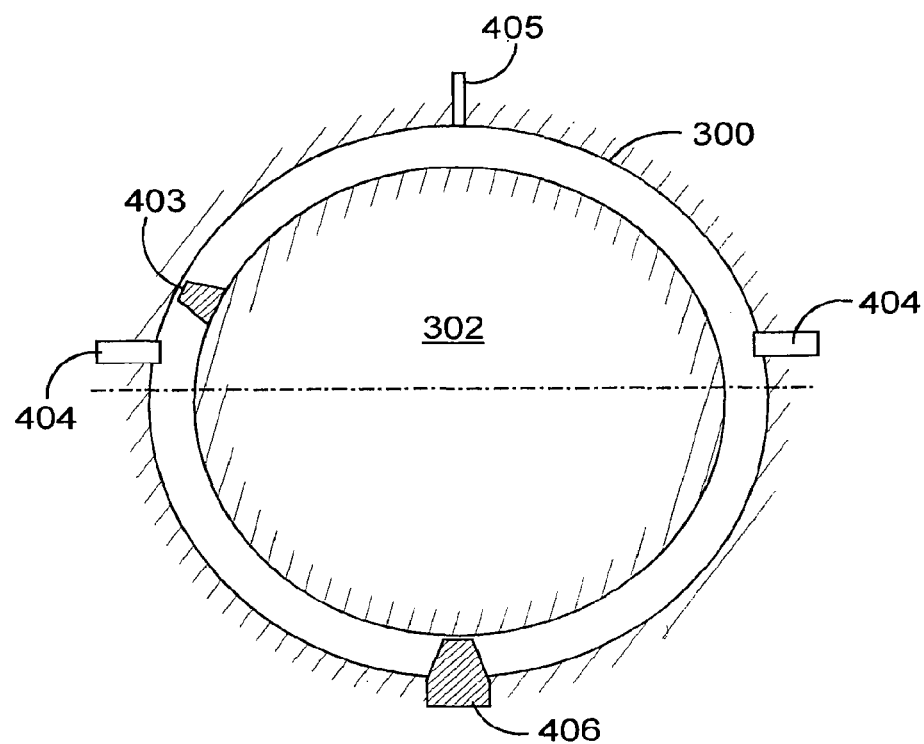
FIG. 13a illustrates a variant of FIGS. 12a and 12b having a separate hydrostatic bearing.
Figure 13B:
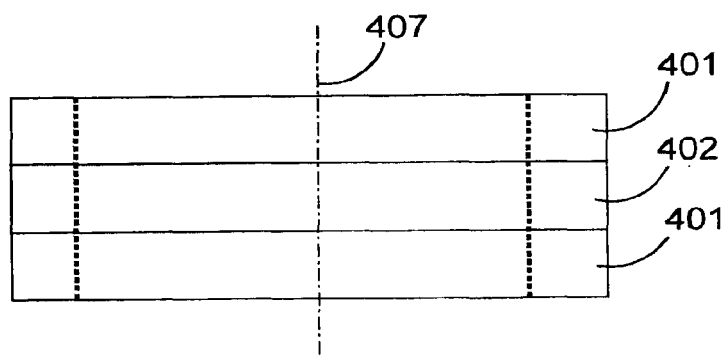
FIG. 13b illustrates a variant of FIGS. 12a and 12b having a separate hydrostatic bearing.

A further refinement of the embodiment of FIGS. 12a and 12b comprises a series of adjacent annular sections as shown in FIGS. 13a and 13b. A first annular section 401 performs the hydrostatic load-supporting bearing. One or more further annular sections 402 provides a motion function. The annular sections of the race are adjacent (side by side). In this manner, the motion range of the race can be 360 degrees and greater, by applying pressure to one side of a vane type seal 403 from successive inlet ports 404. In a preferred embodiment an annular lift section (hydrostatic bearing) is provided on either side of an annular motion section, as shown in FIG. 13b, and rotatable about axis 407.

FIG. 13a also shows an optional drain valve 405, and a vane type seal 406 on the ground element 300. It is envisaged that radial spring loading of vane 403 will permit passage over fixed vane 406 should 360° rotation be required.

Figure 14A:
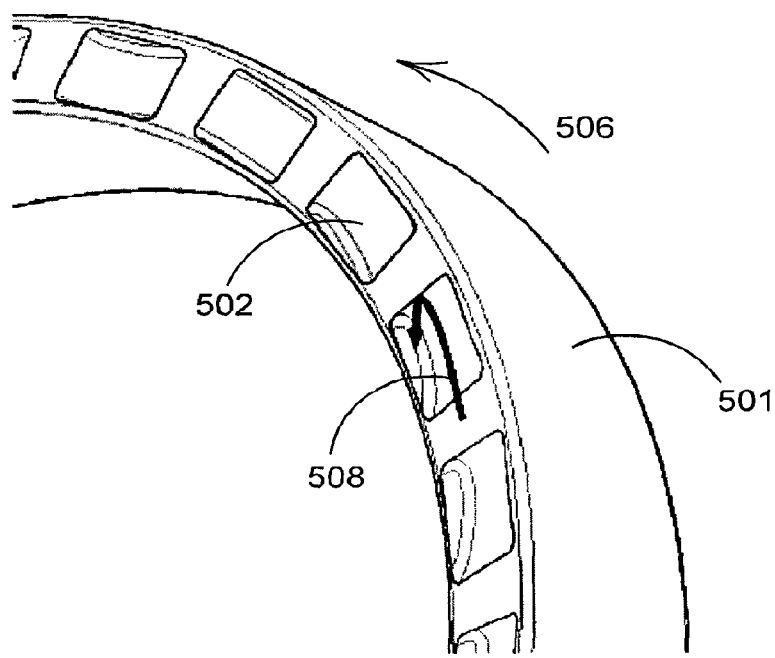
FIG. 14a illustrates schematically an impulse turbine of a race of a ground element.
Figure 14B:
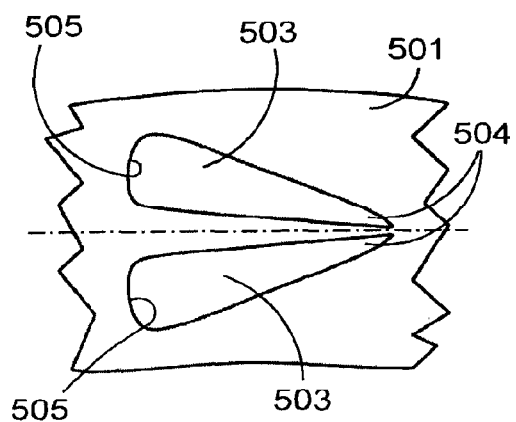
FIG. 14b illustrates schematically an impulse turbine of a race of a ground element.

FIGS. 14a and 14b illustrate a means of rotating the ground element of the bearing assembly by means of an impulse turbine. The ground element race 501 illustrated partially in FIG. 14a, includes pockets 502 around the annular side face thereof. Each pocket is preferably formed as two mirror image recesses 503 having an inlet end 504 and an impulse end 505. The impulse end provides a wall generally transverse to the intended direction of race idling so that impingement of fluid 508 under pressure from one or more jets (not shown) imposes a torque on the race. The jet or jets are provided in an adjacent relatively fixed member, for example the ground element itself, and may be adapted to a variable exit pressure so as to vary the impulse force on the race 501.

The direction of intended movement is illustrated by arrow 506.

Figure 14C:
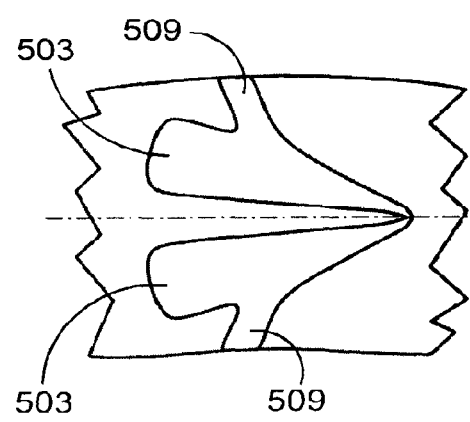
FIG. 14c illustrates schematically an impulse turbine of a race of a ground element.

FIG. 14c illustrate exhaust passages 509 which may be required to ensure adequate flow in the recesses 503. Suitable drain passages (not shown) return exhaust fluid to a reservoir in an arrangement schematically similar to FIG. 7.

It will be understood that suitable recesses 503 may be provided alternatively or additionally in a circumferential surface of the race which is immediately adjacent the ground element.

Figure 15A:
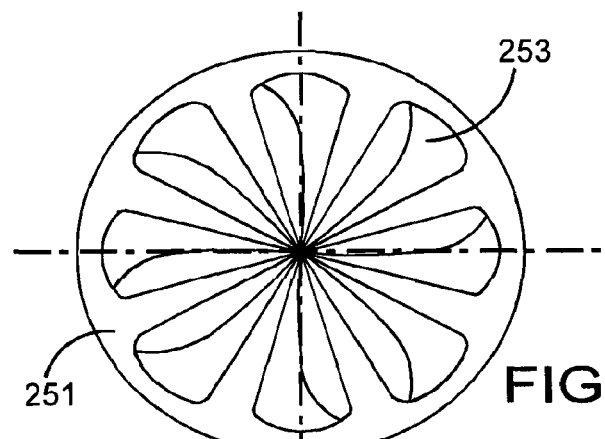
FIG. 15a illustrates schematically a conical turbine adaptation of the embodiment of FIGS. 9 and 10.
Figure 15B:
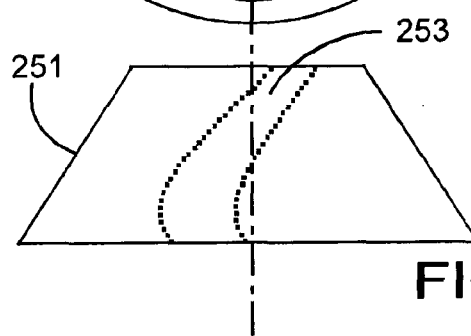
FIG. 15b illustrates schematically a conical turbine adaptation of the embodiment of FIGS. 9 and 10.
Figure 15C:
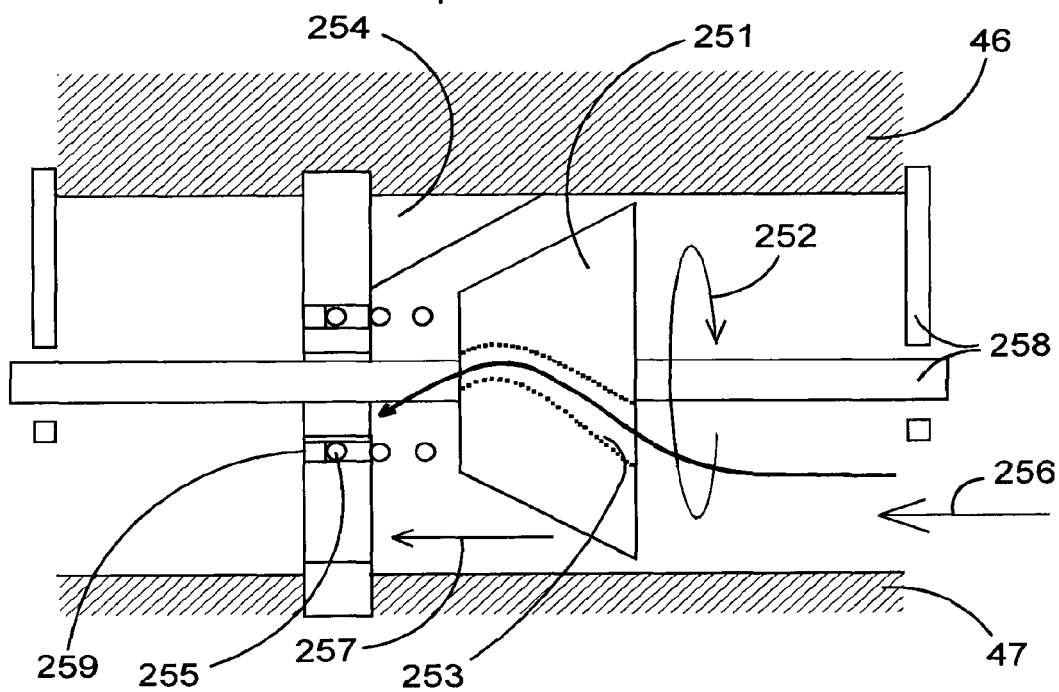
FIG. 15c illustrates schematically a conical turbine adaptation of the embodiment of FIGS. 9 and 10.

FIGS. 15a-15c illustrate an alternative arrangement to the embodiment described with respect to FIGS. 10a-10c.

In place of the rollers of FIG. 7, frusto-conical turbine elements 251 are provided, each having a fluid channel 253 shaped to impart rotational torque upon axial flow of hydraulic fluid.

FIG. 10c illustrates the rotational direction 252 of an element 251, which is urged axially from a mating element 254 by a light spring 255. Application of hydraulic pressure in the direction of arrow 256 causes rotation of the element 251, and axial movement in the direction of arrow 257 due to restriction of flow through the channel 253 and around the peripheral clearance. The mating element 254 is driven in rotation upon contact with the turbine element 251, and drive ceases upon interruption of the hydraulic supply as the spring urges the turbine element out of driving engagement.

The arrangement of FIGS. 15a-15c provides to lower friction losses since the turbine element is not in contact unless active rotation is required.

The turbine elements are preferably not load bearing, and moulded of plastic material.

It will be understood that the channel 253 and spring 255 may be sized to allow the bearing assembly to be supported by a hydrostatic lift force at a first pressure/flow rate, and to be moved at a higher pressure/flow rate which is sufficient to activate drive from the turbine elements 251.

Also illustrated in FIG. 15c is a suitable support structure 258 for the turbine element, e.g. an axle or cage, and a reaction member 259 for the light spring 255.

What is claimed is:

1. A bearing comprising
   a moving element that rotates with respect to a ground element for the bearing,
   a circular member that is adapted to support a rotating load transmitted to the circular member by the moving element, and
   an inner race, an outer race concentric with the inner race, and rolling elements between the inner and outer races, one of said races comprising said circular member,
   wherein said circular member is adapted to idle in rotation on the ground element in a controlled manner,
   wherein the idling rotation is continuous, and
   wherein rotation of the circular member of the ground element is by drag from rolling elements.

2. A bearing according to claim 1 wherein said one of said races is adapted to idle at a speed in the range 0.1 degree per day to 0.1 revolutions per minute.

3. A bearing according to claim 1 wherein said circular member is adapted to idle at a speed at least an order of magnitude less than the speed at which the moving member rotates.

4. A bearing according to claim 1 wherein idling rotation of the circular member is associated with rotation of the moving element.

5. A bearing according to claim 4 wherein idling rotation of the circular member is a direct result of rotation of the moving element.

6. A bearing according to any of claim 1 wherein idling motion is provided by an external power source comprising one of an electric motor, a magnetic motor or a hydraulic motor.

7. A bearing according to claim 1 and further including a hydrostatic bearing being provided between the ground element and the circular member.

8. A bearing according to claim 7 and further including a pump to generate said lift force.

9. A bearing according to claim 1 wherein rotation of the circular member is enabled upon rotation of the moving element.

10. A bearing according to claim 9 wherein rotation of the circular member of the ground element is by periodic thermal expansion reducing running clearances in use.

11. A bearing according to claim 9 wherein idling motion is provided by gearing from one of a race of the moving element, and a cage of the rolling elements associated with a race of the moving element.

* * * * *